(12) United States Patent
Shih et al.

(10) Patent No.: US 11,721,123 B2
(45) Date of Patent: *Aug. 8, 2023

(54) ELECTRONIC CIRCUIT HAVING DISPLAY DRIVING FUNCTION, TOUCH SENSING FUNCTION AND FINGERPRINT SENSING FUNCTION

(71) Applicant: Novatek Microelectronics Corp., Hsinchu (TW)

(72) Inventors: Wei-Lun Shih, Hsinchu (TW); Tzu-Wen Hsieh, Hsinchu (TW); Huan-Teng Cheng, Hsinchu (TW); Huang-Chin Tang, Hsinchu County (TW); Yueh-Teng Mai, Hsinchu (TW); Shi-Hao Huang, Hsinchu County (TW); Jung-Chung Lee, Taoyuan (TW)

(73) Assignee: Novatek Microelectronics Corp., Hsinchu (TW)

( * ) Notice: Subject to any disclaimer, the term of this patent is extended or adjusted under 35 U.S.C. 154(b) by 0 days.

This patent is subject to a terminal disclaimer.

(21) Appl. No.: 17/567,907

(22) Filed: Jan. 4, 2022

(65) Prior Publication Data
US 2022/0130166 A1 Apr. 28, 2022

Related U.S. Application Data

(63) Continuation of application No. 16/921,921, filed on Jul. 6, 2020, now Pat. No. 11,270,095.
(Continued)

(51) Int. Cl.
G06F 3/041 (2006.01)
G09G 5/10 (2006.01)
(Continued)

(52) U.S. Cl.
CPC ........... *G06V 40/1318* (2022.01); *G09G 5/10* (2013.01); *G06F 3/0416* (2013.01); *G09G 2320/0626* (2013.01)

(58) Field of Classification Search
USPC .......................................................... 345/156
See application file for complete search history.

(56) References Cited

U.S. PATENT DOCUMENTS 10,627,938 B2 4/2020 Lee et al.
10,810,401 B2 10/2020 Lo et al.
(Continued)

FOREIGN PATENT DOCUMENTS

CN 102483900 5/2012
CN 107977105 5/2018
(Continued)

OTHER PUBLICATIONS

"Office Action of Taiwan Counterpart Application", dated Dec. 2, 2022, p. 1-p. 3.
(Continued)

*Primary Examiner* — Chineyere D Wills-Burns
(74) *Attorney, Agent, or Firm* — JCIPRNET

(57) ABSTRACT

An electronic circuit adapted to drive a display panel is provided. The display panel includes touch sensors and fingerprint sensors. The electronic circuit includes a touch sensing circuit, a fingerprint sensing circuit and a display driving circuit. The touch sensing circuit senses a touch of a finger and determines a first area corresponding to the touch on the display panel. The fingerprint sensing circuit senses a fingerprint image of the finger corresponding to the first area. The display driving circuit drives pixels of the first area with respective first gray levels and pixels of a second area outside the first area with respective second gray levels. The display driving circuit processes respective third gray (Continued)

levels to obtain the respective second gray levels. The display driving circuit generates gamma voltages corresponding to the respective first gray levels and the respective second gray levels according to the same gamma curve.

26 Claims, 11 Drawing Sheets

Related U.S. Application Data

(60) Provisional application No. 62/889,572, filed on Aug. 21, 2019.

(51) Int. Cl.
*G09G 3/20* (2006.01)
*G06V 40/13* (2022.01)

(56) References Cited

U.S. PATENT DOCUMENTS

| | | | |
|---|---|---|---|
| 11,270,095 B2* | 3/2022 | Shih | G06F 3/041661 |
| 2010/0117940 A1* | 5/2010 | Wu | G09G 3/3611 |
| | | | 345/581 |
| 2012/0194572 A1 | 8/2012 | Saitoh et al. | |
| 2016/0299556 A1* | 10/2016 | Jueng | H04W 12/06 |
| 2017/0004484 A1* | 1/2017 | Seol | G06F 3/04883 |
| 2017/0308215 A1* | 10/2017 | Cho | G06F 3/0487 |
| 2018/0035923 A1 | 2/2018 | Kang et al. | |
| 2018/0113548 A1 | 4/2018 | Lee et al. | |
| 2018/0218195 A1* | 8/2018 | Sheik-Nainar | G06V 10/141 |
| 2018/0348949 A1* | 12/2018 | Kim | G06F 3/0443 |
| 2018/0349669 A1 | 12/2018 | Kim et al. | |
| 2018/0366073 A1* | 12/2018 | Chen | G09G 3/3607 |
| 2019/0354226 A1* | 11/2019 | Choi | G06F 3/0416 |
| 2020/0005018 A1 | 1/2020 | Lo et al. | |

FOREIGN PATENT DOCUMENTS

| | | |
|---|---|---|
| CN | 108985146 | 12/2018 |
| TW | I668637 | 8/2019 |

OTHER PUBLICATIONS

"Notice of allowance of Taiwan Counterpart Application", dated May 24, 2023, p. 1-p. 3.

* cited by examiner

ELECTRONIC CIRCUIT HAVING DISPLAY DRIVING FUNCTION, TOUCH SENSING FUNCTION AND FINGERPRINT SENSING FUNCTION

CROSS-REFERENCE TO RELATED APPLICATION

This application is a continuation application of and claims the priority benefit of U.S. patent application Ser. No. 16/921,921, filed on Jul. 6, 2020, now allowed. The prior U.S. patent application Ser. No. 16/921,921 claims the priority benefit of U.S. Provisional application Ser. No. 62/889,572, filed on Aug. 21, 2019. The entirety of the above-mentioned patent application is hereby incorporated by reference herein and made a part of this specification.

BACKGROUND

Technical Field

The invention relates to an electronic circuit and a driving method, more specifically, to an electronic circuit adapted to drive a display panel including touch sensors and fingerprint sensors and a method for driving the display panel.

Description of Related Art

In recent years, demands for fingerprint sensing have been gradually increased. In order to reduce a volume of an electronic device, a fingerprint sensing region may overlap with a display region of the electronic device. For example, an under-display fingerprint identification technique is to embed fingerprint sensors to a display panel, and the fingerprint sensor may sense or capture a fingerprint image through the display panel. When a touch event such as fingerprint identification happens, a touch sensing circuit may report it to an application processor of the electronic device via a specified interface. Next, the application processor further controls a display driving circuit to drive the display panel to display image for fingerprint sensing. The display driving circuit may control a backlight controller to adjust the backlight of the display panel based on the instruction of the application processor. The whole backlight may be turned on to have the highest brightness. However, the high brightness of the display panel may let users feel uncomfortable.

On the other hand, the application processor further controls a fingerprint sensing circuit to perform the fingerprint sensing operation. The fingerprint sensing circuit transmits sensing information to the application processor for fingerprint identification after the fingerprint sensing operation, and then the application processor completes the fingerprint identification according to the sensing information. However, the touch sensing circuit needs to report the touch event to the application processor, and the display driving circuit and the fingerprint sensing circuit operating for displaying images and fingerprint sensing are based on the instruction of the application processor. Therefore, it may spend more time for fingerprint sensing and identification.

SUMMARY

The invention is directed to an electronic circuit, capable of providing an efficient method for fingerprint sensing and identification and good user experience for users. A method for driving display panel by using the electronic circuit is also provided.

An embodiment of the invention provides an electronic circuit adapted to drive a display panel. The display panel includes touch sensors and fingerprint sensors. The electronic circuit includes a touch sensing circuit, a fingerprint sensing circuit and a display driving circuit. The touch sensing circuit is configured to sense a touch of a finger and determine a first area corresponding to the touch on the display panel. The fingerprint sensing circuit is configured to sense a fingerprint image of the finger corresponding to the first area of the display panel. The display driving circuit is configured to drive pixels of the first area with respective first gray levels and pixels of a second area outside the first area with respective second gray levels. The display driving circuit processes respective third gray levels to obtain the respective second gray levels. The display driving circuit generates gamma voltages corresponding to the respective first gray levels and the respective second gray levels according to a same gamma curve.

An embodiment of the invention provides an electronic circuit adapted to drive a display panel. The display panel includes touch sensors and fingerprint sensors. The electronic circuit includes a touch sensing circuit, a fingerprint sensing circuit and a display driving circuit. The touch sensing circuit is configured to sense a touch of a finger and determine a first area corresponding to the touch on the display panel. The fingerprint sensing circuit is configured to sense a fingerprint image of the finger corresponding to the first area of the display panel. The display driving circuit is configured to drive pixels of the first area with respective first gray levels and pixels of a second area outside the first area with respective second gray levels. The display driving circuit generates first gamma voltages corresponding to the respective first gray levels according to a first gamma curve in an operation mode, and the display driving circuit generates second gamma voltages corresponding to the respective second gray levels according to a second gamma curve in the operation mode.

An embodiment of the invention provides an electronic circuit adapted to drive a display panel. The display panel includes touch sensors and fingerprint sensors. The electronic circuit includes a touch sensing circuit, a fingerprint sensing circuit, a first interface circuit, a display driving circuit and a second interface circuit. The touch sensing circuit is configured to sense a touch of a finger and determine a first area corresponding to the touch on the display panel. The fingerprint sensing circuit is configured to sense a fingerprint image of the finger corresponding to the first area of the display panel. The touch sensing circuit, via the first interface circuit, controls the fingerprint sensing circuit to scan the first area and sense the fingerprint image from the first area. The display driving circuit is configured to drive pixels of the first area of the display panel. The touch sensing circuit, via the second interface circuit, controls the display driving circuit to drive the pixels of the first area. The electronic circuit is implemented in a single semiconductor chip, and the first interface circuit and the second interface circuit are disposed inside the single semiconductor chip.

An embodiment of the invention provides an electronic circuit adapted to drive a display panel. The display panel includes touch sensors and fingerprint sensors. The electronic circuit includes a touch sensing circuit, a fingerprint sensing circuit, a first interface circuit, a display driving circuit and a second interface circuit. The touch sensing circuit is configured to sense a touch of a finger and determine a first area corresponding to the touch on the display panel. The fingerprint sensing circuit is configured to sense a fingerprint image of the finger corresponding to the first area of the display panel. The touch sensing circuit, via the first interface circuit, controls the fingerprint sensing circuit to scan the first area and sense the fingerprint image of the finger from the first area. The display driving circuit is configured to drive pixels of the first area of the display panel. The touch sensing circuit, via the second interface circuit, controls the display driving circuit to drive the pixels of the first area. The electronic circuit is implemented in at least two semiconductor chips includes a first semiconductor chip and a second semiconductor chip. The first semiconductor chip includes the touch sensing circuit and the display driving circuit. The second semiconductor chip includes the fingerprint sensing circuit. The second interface circuit is disposed inside the first semiconductor chip, and the first semiconductor chip and the second semiconductor chip communicate with each other via the first interface circuit.

An embodiment of the invention provides a method for driving a display panel. The display panel includes touch sensors and fingerprint sensors. The method includes: sensing a touch of a finger to determine a first area corresponding to the touch on the display panel; sensing a fingerprint image of the finger corresponding to the first area of the display panel; driving pixels of the first area with respective first gray levels and pixels of a second area outside the first area with respective second gray levels; processing respective third gray levels to obtain the respective second gray levels; and generating gamma voltages corresponding to the respective first gray levels and the respective second gray levels according to a same gamma curve.

An embodiment of the invention provides a method for driving a display panel. The display panel includes touch sensors and fingerprint sensors. The method includes: sensing a touch of a finger to determine a first area corresponding to the touch on the display panel; sensing a fingerprint image of the finger corresponding to the first area of the display panel; driving pixels of the first area with respective first gray levels and pixels of a second area outside the first area with respective second gray levels; generating first gamma voltages corresponding to the respective first gray levels according to a first gamma curve in an operation mode; and generating second gamma voltages corresponding to the respective second gray levels according to a second gamma curve in the operation mode.

To make the aforementioned more comprehensible, several embodiments accompanied with drawings are described in detail as follows.

BRIEF DESCRIPTION OF THE DRAWINGS

The accompanying drawings are included to provide a further understanding of the disclosure, and are incorporated in and constitute a part of this specification. The drawings illustrate exemplary embodiments of the disclosure and, together with the description, serve to explain the principles of the disclosure.

DESCRIPTION OF THE EMBODIMENTS

Embodiments are provided below to describe the disclosure in detail, though the disclosure is not limited to the provided embodiments, and the provided embodiments can be suitably combined. The term "coupling/coupled" or "connecting/connected" used in this specification (including claims) of the application may refer to any direct or indirect connection means. For example, "a first device is coupled to a second device" should be interpreted as "the first device is directly connected to the second device" or "the first device is indirectly connected to the second device through other devices or connection means." The term "signal" can refer to a current, a voltage, a charge, a temperature, data, electromagnetic wave or any one or multiple signals. In addition, the term "and/or" can refer to "at least one of". For example, "a first signal and/or a second signal" should be interpreted as "at least one of the first signal and the second signal".

Figure 1:
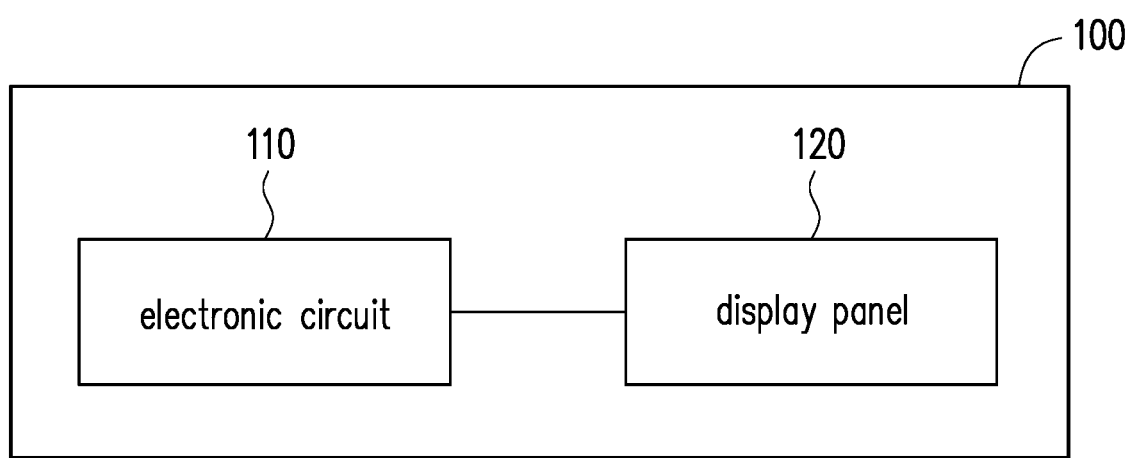
FIG. 1 is a schematic block diagram illustrating an electronic device according to an embodiment of the invention.

FIG. 1 is a schematic block diagram illustrating an electronic device according to an embodiment of the invention. Referring to FIG. 1, the electronic device 100 of the present embodiment includes an electronic circuit 110 and a display panel 120. The display panel 120 includes touch sensors and fingerprint sensors. The electronic circuit 110 is configurable to be coupled to the display panel 120. The electronic circuit 110 is adapted to drive the display panel 120.

In the present embodiment, the electronic device 100 may be an electronic device having a display function, a touch sensing function and a fingerprint sensing function. In an embodiment, the electronic device 100 may be, but not limited to, a smartphone, a non-smart phone, a wearable electronic device, a tablet computer, a personal digital assistant, a notebook and other portable electronic devices that can operate independently and have the display function, the touch sensing function and the fingerprint sensing function. In an embodiment, the electronic device 100 may be, but not limited to, a portable or un-portable electronic device in a vehicle intelligent system. In an embodiment, the electronic device 100 may be, but not limited to, intelligent home appliances such as, a television, a computer, a refrigerator, a washing machine, a telephone, an induction cooker, a table lamp and so on.

Figure 2:
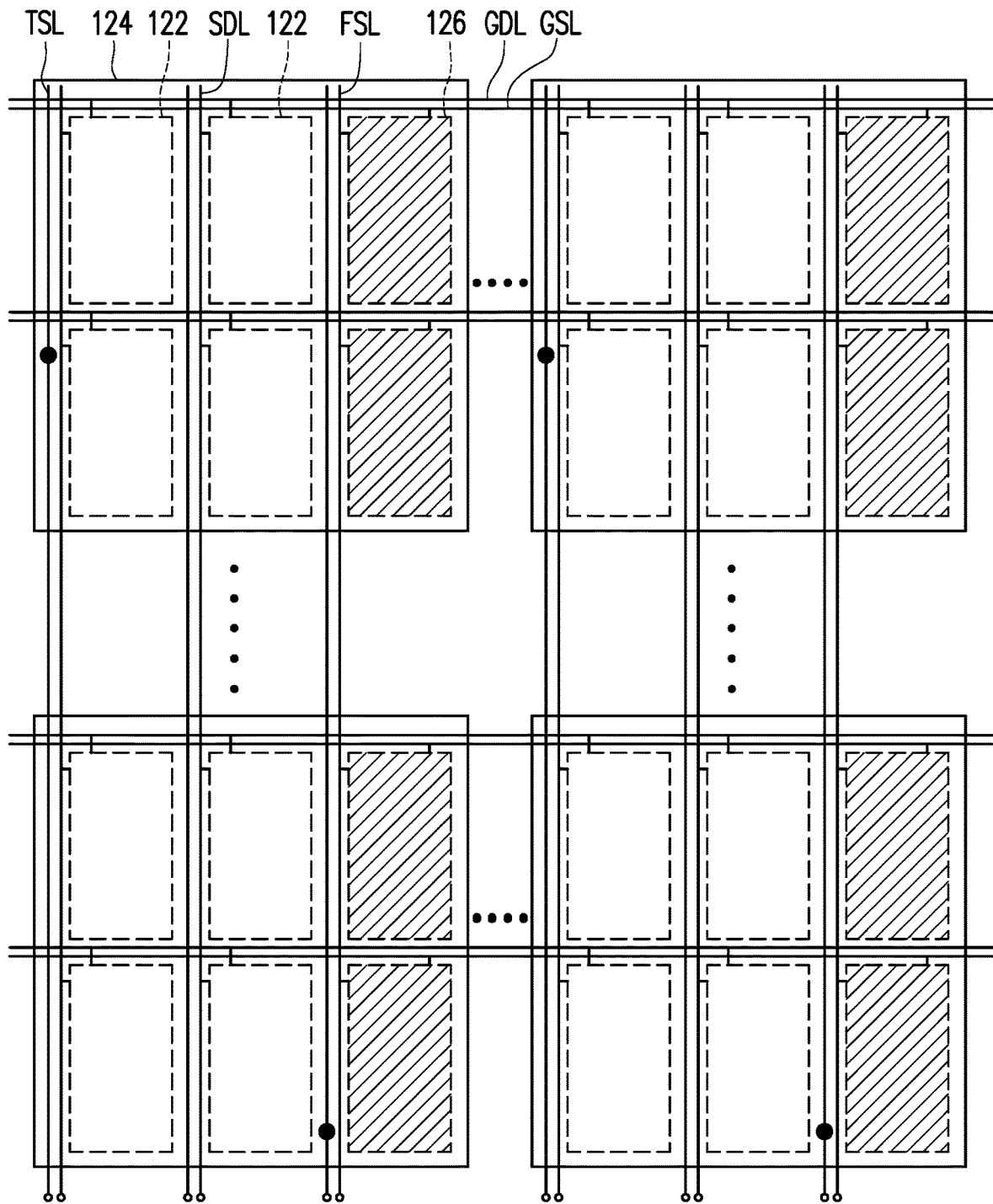
FIG. 2 is a schematic diagram illustrating the display panel depicted in FIG. 1.

FIG. 2 is a schematic diagram illustrating the display panel depicted in FIG. 1. Referring to FIG. 2, the display panel 120 of the present embodiment includes a plurality of display pixels 122, a plurality of touch sensors 124 and a plurality of fingerprint sensors 126. The electronic circuit 110 drives and controls the display panel 120 to perform a display operation, a touch sensing operation and a fingerprint sensing operation. To be specific, the electronic circuit 110 drives and controls the display pixels 122 to display images via display scan lines GDL and display data lines SDL. The electronic circuit 110 also drives and controls the touch sensors 124 to sense a touch event of the display panel 120 via touch scan lines and touch sensing lines TSL. In an embodiment, the touch sensors 124 may be touch sensing electrodes in a touch sensing phase, and the touch sensors 124 may be common electrodes in a display phase. In the present embodiment, in-cell touch sensors are depicted in FIG. 2 as an example. For the in-cell touch sensors, the display panel 120 inherently has no touch scan lines. For other type touch sensors, the display panel 120 may have touch scan lines for transmitting touch driving signals. The electronic circuit 110 also drives and controls the fingerprint sensors 126 to sense a fingerprint image on the display panel 120 via fingerprint scan lines GSL and fingerprint sensing lines FSL.

In an embodiment, the display panel 120 may be an in-cell fingerprint, touch and display panel that the fingerprint sensors and the touch sensors are embedded, but the invention is not limited thereto. In an embodiment, the electronic circuit 110 may drive and control the electronic device 100 to perform an in-display fingerprint identification operation, i.e. fingerprint recognition operation. In an embodiment, the fingerprint sensors 126 may be optical fingerprint sensors.

Figure 3:
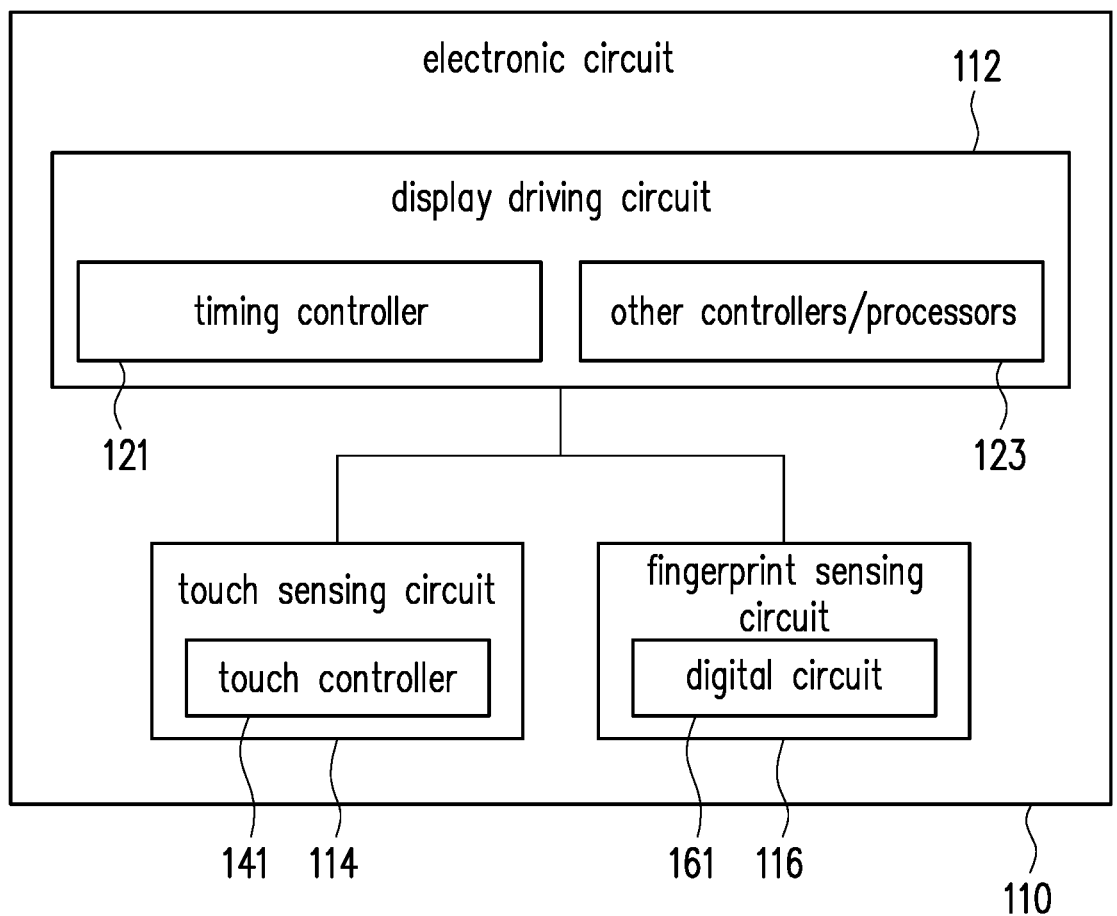
FIG. 3 is a schematic block diagram illustrating the electronic circuit depicted in FIG. 1.

FIG. 3 is a schematic block diagram illustrating the electronic circuit depicted in FIG. 1. Referring to FIG. 3, the electronic circuit 110 may include a display driving circuit 112, a fingerprint sensing circuit 116 and a touch sensing circuit 114. The display driving circuit 112 is configured to drive and control the display pixels 122 to display images via the display scan lines GDL and the display data lines SDL. The display driving circuit 112 generates display driving signals for driving the display data lines SDL of the display panel 120. The display driving circuit 112 may include a timing controller 121, a display driver and other functional circuits for the display operation. The display driving circuit 112 may also include other controllers or processors 123 for other control activities of the display operation. The touch sensing circuit 114 is configured to drive and control the touch sensors 124 to sense the touch event of the display panel 120 via the touch sensing lines TSL. The touch sensing circuit 114 may include a touch controller 141, an analog front end (AFE) circuit, an analog-to-digital converter (ADC) circuit and other functional circuits for the touch sensing operation. The fingerprint sensing circuit 116 is configured to drive and control the fingerprint sensors 126 to sense the fingerprint on the display panel 120 via the fingerprint scan lines GSL and the fingerprint sensing lines FSL. The fingerprint sensing circuit 116 receives fingerprint sensing signals corresponding to a fingerprint image from the fingerprint sensors 126 and may also process the fingerprint sensing signals to obtain the fingerprint image. The fingerprint sensing circuit 116 may include a digital circuit 161, an AFE circuit, an ADC circuit and other functional circuits for the fingerprint sensing operation.

In an embodiment, when the electronic circuit 110 is implemented as a single chip integrated circuit that can drive and control the display panel 120 to perform the display operation, the touch sensing operation and the fingerprint sensing operation, the electronic circuit 110 may include a control circuit 130, and the control circuit 130 may be a micro-controller based core to perform all of control activities of the display operation, the touch sensing operation and the fingerprint sensing operation. The control circuit 130 may include at least one of the timing controller 121, the touch controller 141, the digital circuit 161, and the other controllers or processors 123 of the display driving circuit 112.

The display driving circuit 112, the touch sensing circuit 114 and the fingerprint sensing circuit 116 communicate with one another via signal transmission interfaces, such as Mobile Industry Processor Interface (MIPI), Inter-Integrated Circuit (I2C) Interface, Serial Peripheral Interface (SPI) and/or other similar or suitable interfaces.

Regarding hardware structures of the components in the embodiment of FIG. 3, the timing controller 121, the touch controller 141 and the digital circuit 161 may be a processor having computational capability. Alternatively, the timing controller 121, the touch controller 141 and the digital circuit 161 may be designed through hardware description languages (HDL) or any other design methods for digital circuits familiar to people skilled in the art and may be hardware circuits implemented through a field programmable gate array (FPGA), a complex programmable logic device (CPLD), or an application-specific integrated circuit (ASIC). In addition, enough teaching, suggestion, and implementation illustration for hardware structures of the display driving circuit 112, the touch sensing circuit 114 and the fingerprint sensing circuit 116 can be obtained with reference to common knowledge in the related art, which is not repeated hereinafter.

Figure 4:
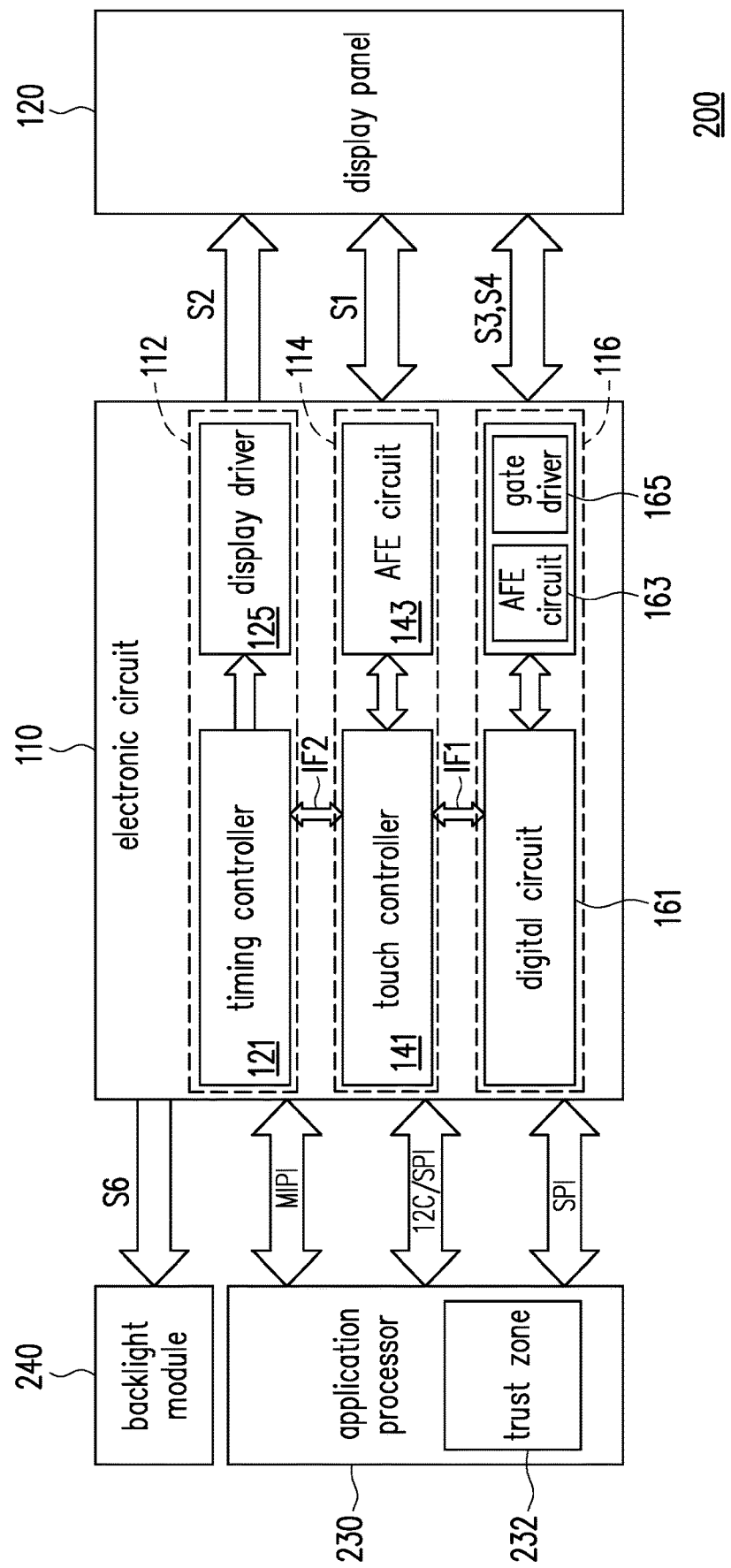
FIG. 4 is a schematic block diagram illustrating an electronic device according to another embodiment of the invention.

FIG. 4 is a schematic block diagram illustrating an electronic device according to another embodiment of the invention. Referring to FIG. 4, the electronic device 200 of the present embodiment includes the electronic circuit 110, the display panel 120, an application processor 230 and a backlight module 240. The electronic circuit 110 includes the display driving circuit 112, the touch sensing circuit 114, the fingerprint sensing circuit 116, a first interface circuit IF1 and a second interface circuit IF2. The first interface circuit IF1 includes circuits for transmitting and receiving signals arranged in the touch sensing circuit 114 and/or the fingerprint sensing circuit 116. The second interface circuit IF2 includes circuits for transmitting and receiving signals arranged in the touch sensing circuit 114 and/or the display driving circuit 112. The touch sensing circuit 114 and the fingerprint sensing circuit 116 communicate with each other via the first interface circuit IF1. The display driving circuit 112 and the touch sensing circuit 114 communicate with each other via the second interface circuit IF2.

In the present embodiment, the electronic circuit 110 co-operates with the display panel 120 and the application processor 230 for a fingerprint identification operation. The electronic circuit 110 outputs a fingerprint image to a trust zone 232 of the application processor 230 to perform the fingerprint identification operation, i.e. a fingerprint recognition operation. Enough teaching, suggestion, and implementation illustration for the fingerprint identification operation can be obtained with reference to common knowledge in the related art, which is not repeated hereinafter.

Figure 5:
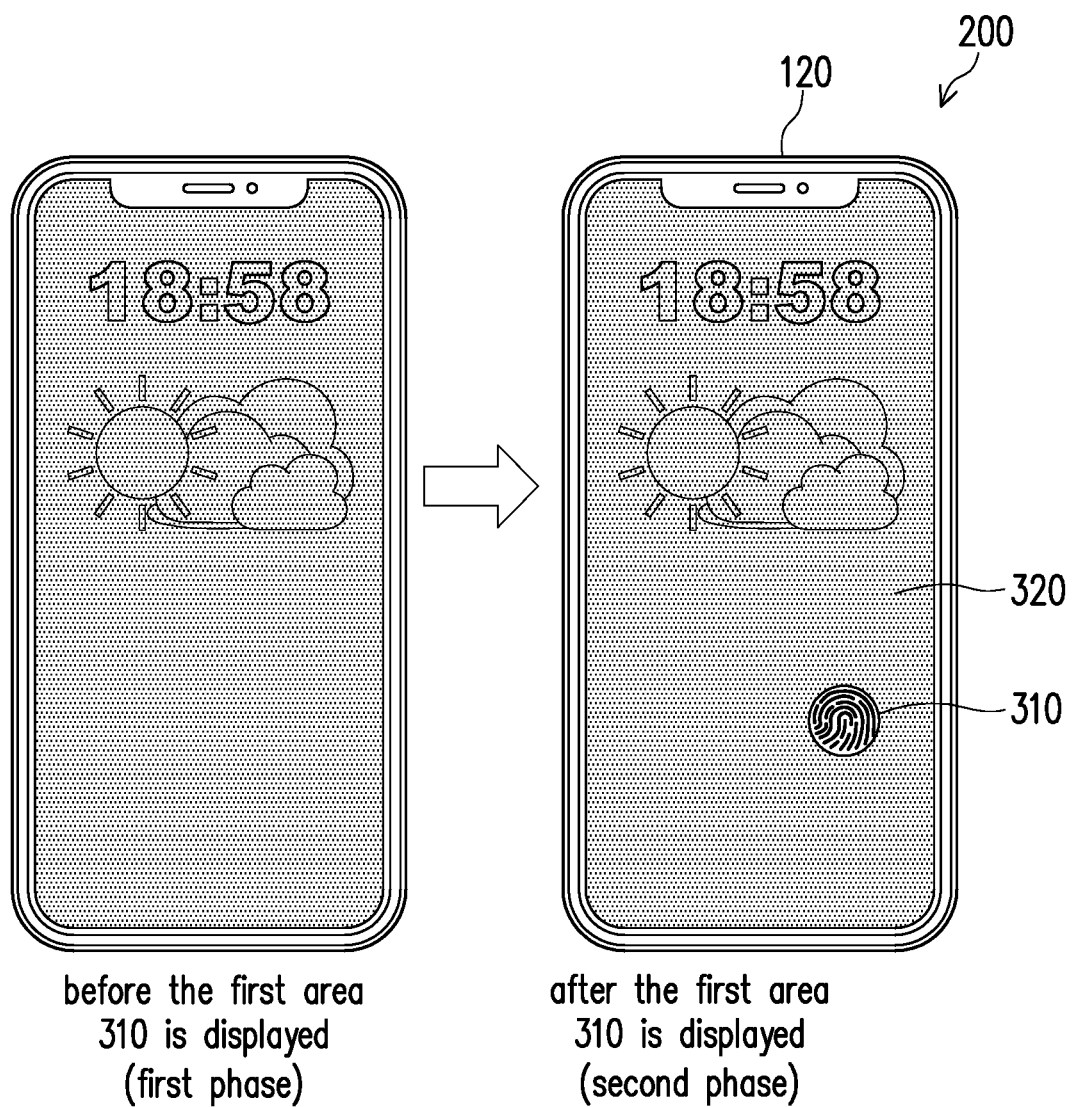
FIG. 5 illustrates the electronic device depicted in FIG. 4 operating in a first operation mode according to an embodiment of the invention.

FIG. 5 illustrates the electronic device depicted in FIG. 4 operating in a first operation mode according to an embodiment of the invention. The first operation mode, for example, may be operated when users login in the electronic device 200 at a power on state, or re-sign in the electronic device 200 from an idle state. Referring to FIG. 4 and FIG. 5, the electronic device 200 of the present embodiment may be a smartphone or a similar device that has an application processor 230, but the invention is not limited thereto. In the first operation mode, the display driving circuit 112 drives pixels over the display panel 120 with respective first gray levels during a first phase. Therefore, a dark screen is displayed on the whole of the display panel 120 before a first area 310 is displayed (the first phase). During the first phase, the fingerprint sensing circuit 116 may be idle and work in a power saving mode. The touch sensing circuit 114 is configured to sense a touch of a finger and determine the first area 310 corresponding to the touch on the display panel 120. The touch sensing circuit 114, via the second interface circuit IF2, controls the display driving circuit 112 to drive the pixels of the first area 310 with respective second gray levels and the pixels of a second area 320 outside the first area 310 with respective third gray levels during a second phase later than the first phase. In present embodiment, the respective second gray levels are higher than the respective first gray levels, and the respective third gray levels are lower than the respective second gray levels. Therefore, the first area 310 with a high brightness is displayed on the display panel 120 and can serve as a fingerprint input region after the first area 310 is displayed (the second phase). During the second phase, the fingerprint sensing circuit 116 works in a normal power mode. The brightness of the backlight in the second phase is larger than that in the first phase. The first area 310 may be displayed as a white region or a region with a predetermined color. The dark screen may be still displayed on the second area 320. In this case, the respective third gray levels are substantially the same as the respective first gray levels.

The touch sensing circuit 114 includes a touch controller 141 and an AFE circuit 143. The AFE circuit 143 receives a touch sensing signal S1 from the display panel 120 and processes and transmits the touch sensing signal S1 to the touch controller 141. The touch controller 141 determines the first area 310 corresponding to the touch on the display panel 120 according to the touch sensing signal S1. The touch controller 141 may obtain coordinate information and size information of the touch to determine the first area 310 accordingly. The size and shape of the first area may be predetermined or may depend on the size and shape of the detected touch area. In an embodiment, the first area is determined with suitable size and shape such that it can be completely covered by the finger as scanning fingerprint. In an embodiment, the AFE circuit 143 may transmit a touch driving signal to the touch sensors 124 of FIG. 2 and receive the touch sensing signal S1 therefrom. The touch sensing signal S1 is transmitted to the touch controller 141 for judging if a touch happens or not.

The touch sensing circuit 114, via the second interface circuit IF2, controls the display driving circuit 112. The display driving circuit 112 is configured to drive pixels of the first area 310 of the display panel 120 with a display pattern indicating the fingerprint input region. The display driving circuit 112 includes a timing controller 121 and a display driver 125. The display driver 125 drives the display panel 120 to display images via driving signals S2. In the present embodiment, the display driver 125 drives the display panel 120 to display a circular area (the first area 310) to indicate the fingerprint input region, but the invention is not limited thereto. In other embodiments, the display pattern may be displayed as any suitable form for fingerprint input. Enough teaching, suggestion, and implementation illustration for the method for controlling and driving the display panel 120 can be obtained with reference to common knowledge in the related art, which is not repeated hereinafter.

In the present embodiment, the touch sensing circuit 114, via the second interface circuit IF2, controls the display driving circuit 112 to adjust the backlight module 240 of the electronic device 200 by a pulse width modulation (PWM) signal S6. For example, the touch controller 141 may inform the display driving circuit 112, and then a backlight controller of the display driving circuit 112 outputs the PWM signal S6 to adjust the brightness of backlight by adjusting a duty ratio of the PWM signal S6. Also, a frequency of the PWM signal can be adjusted. By adjusting the frequency of the PWM signal S6, an optimized frequency can be provided to the backlight module 240. Therefore, the first area 310 with a high brightness is displayed on the display panel 120 to serve as the fingerprint input region. The first area 310 may be displayed as a white region or a region with a predetermined color. The dark screen may be still displayed on a second area 320 outside the first area 310.

On the other hand, the touch controller 141 determines whether the touch is valid. When the detected touch area of the touch is larger than a predetermined threshold area, the touch controller 141 determines the touch as a valid touch. That is to say, the touch is recognized valid if the detected touch area is larger than the predetermined threshold area. The touch controller 141, via the first interface circuit IF1, controls the fingerprint sensing circuit 116 to initiate the fingerprint scanning for the first area 310 when the valid touch happens. In other embodiments, the touch controller 141 may determine whether the touch is valid according to shape, strength and/or touch times of the touch. For example, a double click or a long-time touch may be determined as a valid touch.

Compared to the global display region of the display panel 120, the first area 310 is a local display region of the display panel 120 for fingerprint input, such that the speed of the fingerprint scanning may become faster. The fingerprint sensing circuit 116 is configured to sense the fingerprint image of the finger corresponding to the first area 310 of the display panel 120. The fingerprint sensing circuit 116 includes a digital circuit 161, an AFE circuit 163 and a gate driver 165. The gate driver 165 drives the fingerprint sensors 126 corresponding to the first area 310 to perform the fingerprint sensing operation via a driving signal S4, and thus the fingerprint sensors 126 corresponding to the first area 310 transmit a fingerprint sensing signal S3 to the AFE circuit 163. The AFE circuit 163 receives the fingerprint sensing signal S3 from the display panel 120 and processes and transmits the fingerprint sensing signal S3 to the digital circuit 161. Next, the digital circuit 161 generates and transmits the fingerprint image to the application processor 230 for the fingerprint identification operation via an interface (e.g. SPI in FIG. 4) between the application processor 230 and the electronic circuit 110.

In the present embodiment, the fingerprint sensing circuit 116 may work in the normal power mode or the power saving mode. During the second phase, the touch controller 141 wakes up the fingerprint sensing circuit 116 from the power saving mode to the normal power mode, and outputs the location and size information of the first area 310 to the fingerprint sensing circuit 116 via the first interface circuit IF1. The fingerprint sensing circuit 116 initiates the fingerprint scanning for the first area 310. In an embodiment, when the fingerprint scanning is performed, the gate driver 165 drives the fingerprint scan lines GSL corresponding to the first area 310 that are arranged in a Y-direction, and the AFE circuit 163 receives the fingerprint sensing signal S3 from the fingerprint sensing lines FSL corresponding to the first area 310 that are arranged in an X-direction. The fingerprint scanning is performed only for the first area 310 determined by the touch controller 141 in the embodiment.

In the present embodiment, the first interface circuit IF1 is located between the touch sensing circuit 114 and the fingerprint sensing circuit 116, and the second interface circuit IF2 is located between the touch sensing circuit 114 and the display driving circuit 112. The touch sensing circuit 114 directly controls the display driving circuit 112 to adjust the backlight and display the fingerprint input region via the second interface circuit IF2 without via the application processor 230. The touch sensing circuit 114 directly controls the fingerprint sensing circuit 116 to perform the fingerprint scanning and sensing operation via the first interface circuit IF1 without via the application processor 230. The time for performing the fingerprint scanning and sensing operation can be reduced.

Regarding hardware structures of the components in the embodiment of FIG. 4, the timing controller 121, the touch controller 141 and the digital circuit 161 may be processors having computational capability. Alternatively, the timing controller 121, the touch controller 141 and the digital circuit 161 may be designed through hardware description languages (HDL) or any other design methods for digital circuits familiar to people skilled in the art and may be hardware circuits implemented through a field programmable gate array (FPGA), a complex programmable logic device (CPLD), or an application-specific integrated circuit (ASIC).

Figure 6:
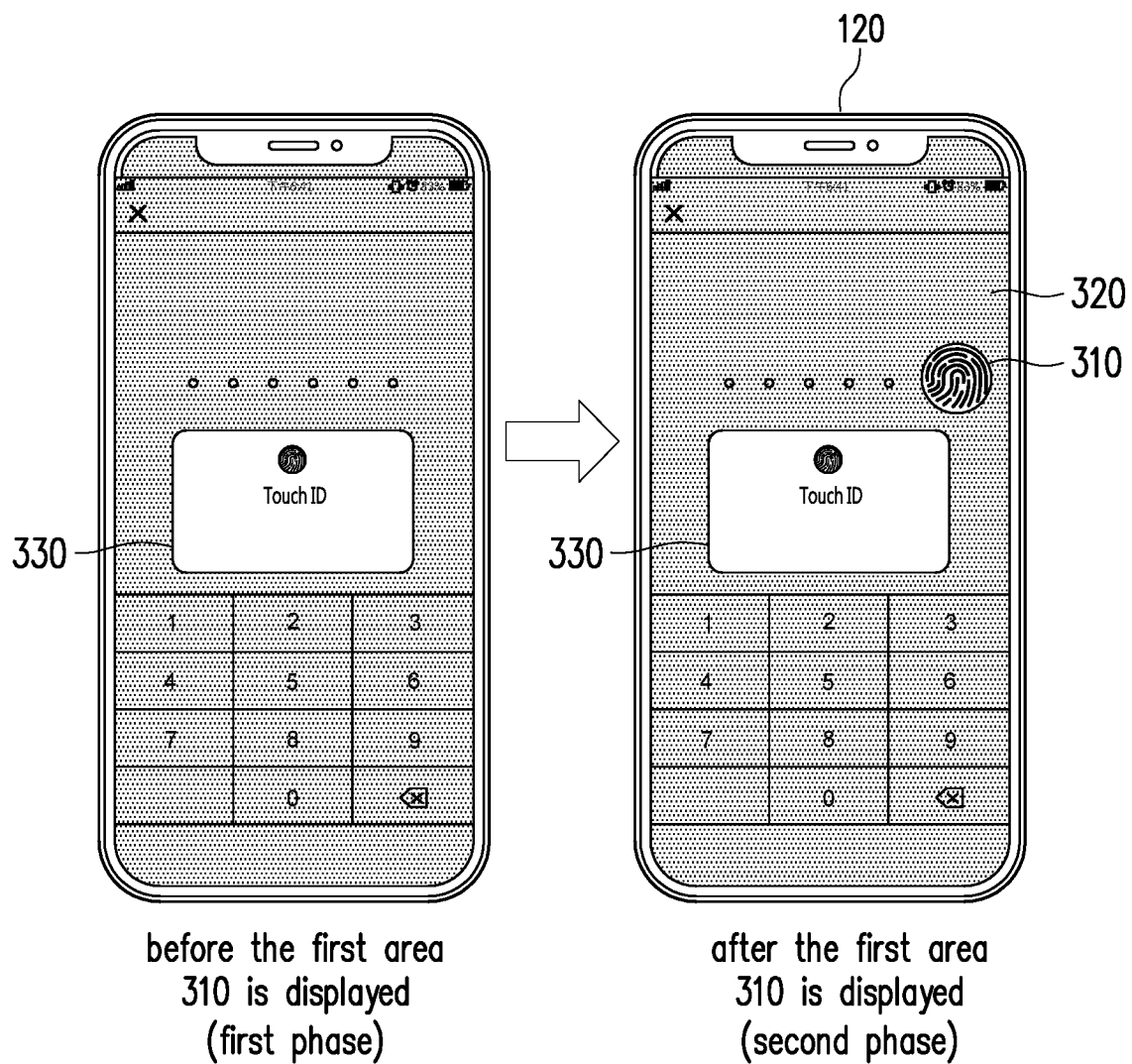
FIG. 6 illustrates the electronic device depicted in FIG. 4 operating in a second operation mode according to an embodiment of the invention.

FIG. 6 illustrates the electronic device depicted in FIG. 4 operating in a second operation mode according to an embodiment of the invention. Referring to FIG. 4 and FIG. 6, the electronic device 200 is not idle in the second operation mode. At least one part region 330 of the display panel 120 with a brightness higher than a dark screen is displayed in the second operation mode for some application, such as mobile payment or bank login, but the invention is not limited thereto. In an embodiment, a bright screen may be displayed on the whole of the display panel 120 during the first phase in the second operation mode. The brightness of the bright screen is not as high as that of the first area 310 to be displayed during the second phase. The first area 310 with a high brightness is displayed on the display panel 120 to serve as the fingerprint input region during the second phase. The first area 310 may be displayed as a white region or a region with a predetermined color. The bright screen may be still displayed on the second area 320 during the second phase.

The touch sensing circuit 114, via the first interface circuit IF1, controls the fingerprint sensing circuit 116 to initiate the fingerprint scanning for the first area 310 and sense the fingerprint image of the finger from the first area 310. The fingerprint sensing circuit 116 transmits the fingerprint image to the application processor 230 for the fingerprint identification operation performed by the application processor 230. The operation of the electronic device 200 in the embodiment of the invention has been sufficiently taught, suggested, and embodied in the embodiments illustrated in FIG. 4 and FIG. 5, and therefore no further description is provided herein.

Figure 7:
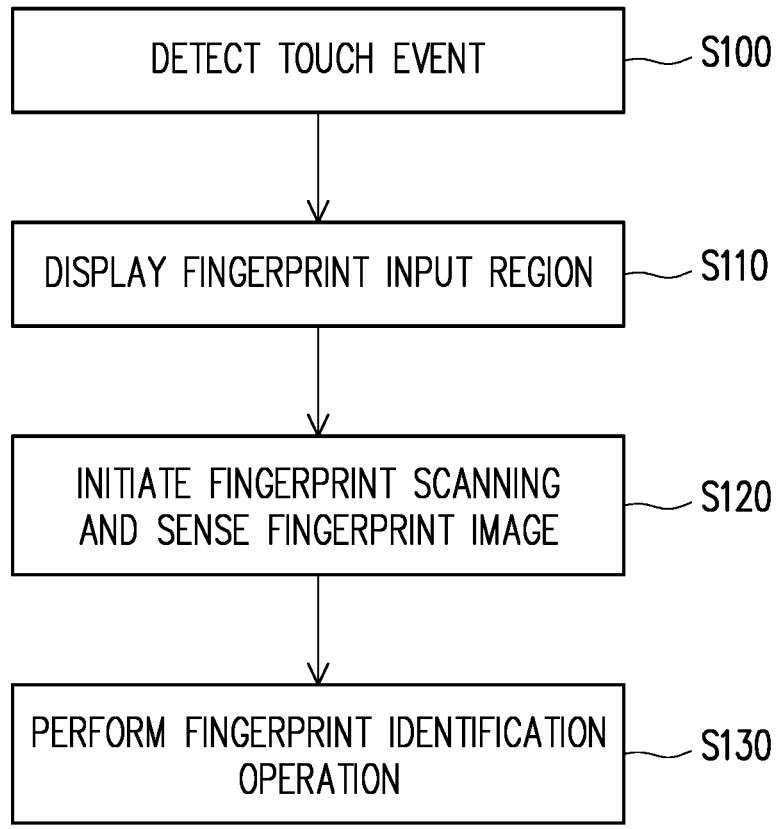
FIG. 7 is a flowchart illustrating steps in a method for fingerprint identification according to an embodiment of the invention.

FIG. 7 is a flowchart illustrating steps in a method for fingerprint identification according to an embodiment of the invention. Referring to FIG. 4 to FIG. 7, the method for fingerprint identification of the present embodiment is at least adapted to the electronic device 200 depicted in FIG. 4, but the disclosure is not limited thereto. Taking the electronic device 200 for example, in step S100, the touch controller 141 detects a touch event of the display panel 120 to determine a first area 310. The touch event includes fingerprint identification. In step S110, the touch controller 141 informs the display driving circuit 112 via the second interface circuit IF2 to display the first area 310 with a higher brightness and the second area 320 with a lower brightness. The first area 310 with the higher brightness serves as the fingerprint input region. In step S110, the backlight module 240 may increase the brightness of the backlight of the electronic device 200 according to the instruction of the backlight controller. In step S120, the touch controller 141 wakes up the fingerprint sensing circuit 116 via the first interface circuit IF1 and controls the fingerprint sensing circuit 116 to initiate the fingerprint scanning for the first area 310 and sense the fingerprint image of the finger from the first area 310. In step S130, the application processor 230 receives the fingerprint image from the fingerprint sensing circuit 116 and performs the fingerprint identification operation in the trust zone 232.

Other features of the method for fingerprint identification in the embodiment of the invention are sufficiently taught, suggested, and embodied in the embodiments illustrated in FIG. 4 to FIG. 6, and therefore no further description is provided herein.

Figure 8:
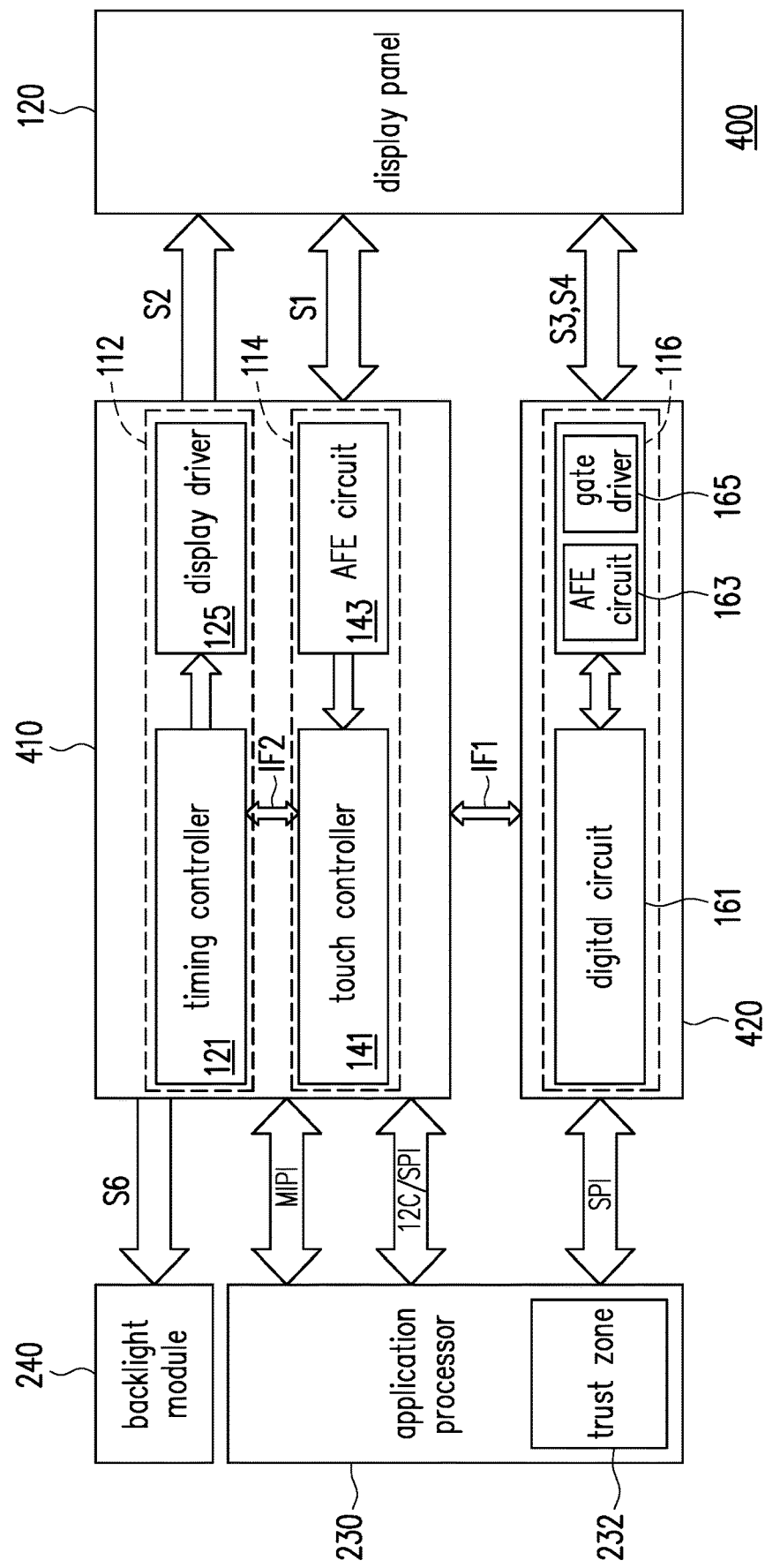
FIG. 8 is a schematic block diagram illustrating an electronic device according to another embodiment of the invention.

FIG. 8 is a schematic block diagram illustrating an electronic device according to another embodiment of the invention. Referring to FIG. 4, the display driving circuit 112, the touch sensing circuit 114 and the fingerprint sensing circuit 116 may be formed in a single semiconductor chip that can drive and control the display panel 120 to perform the display operation, the touch sensing operation and the fingerprint sensing operation. The electronic device 400 depicted in FIG. 8 is similar to the electronic device 200 depicted in FIG. 4, and the main difference therebetween, for example, lies in that the display driving circuit 112 and the touch sensing circuit 114 may be formed in a first semiconductor chip 410 that can drive and control the display panel 120 to perform the display operation and the touch sensing operation, and the fingerprint sensing circuit 116 may be formed in a second semiconductor chip 420 which is different from the first semiconductor chip. The second semiconductor chip 420 may be a readout integrated circuit (ROIC) chip. The ROIC is an integrated circuit configured to read signals from fingerprint sensors.

The first semiconductor chip 410 and the second semiconductor chip 420 may communicate with each other via the first interface circuit IF1. In addition, the operation of the electronic device 400 in the embodiment of the invention is sufficiently taught, suggested, and embodied in the embodiments illustrated in FIG. 4 to FIG. 7, and therefore no further description is provided herein.

Figure 9:
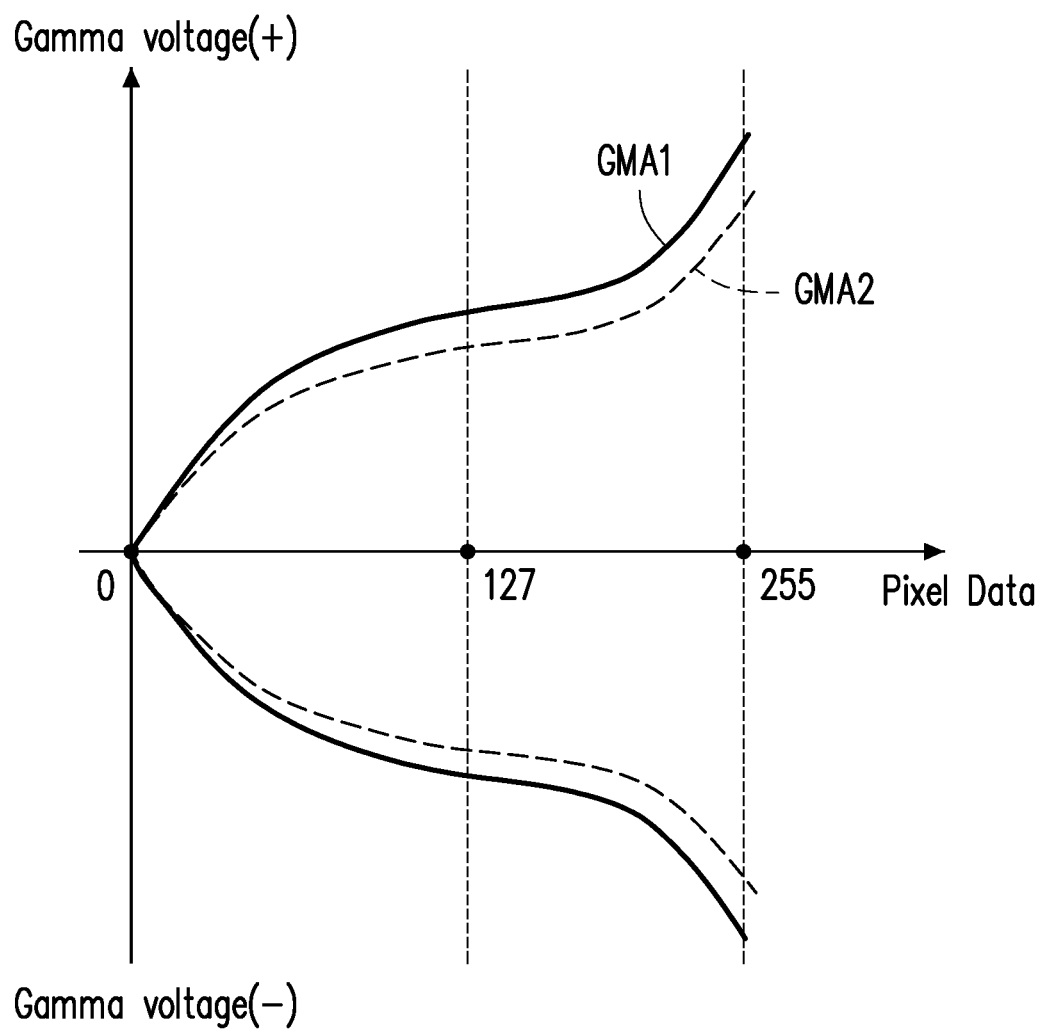
FIG. 9 illustrates a voltage conversion operation according to an embodiment of the invention.

FIG. 9 illustrates a voltage conversion operation according to an embodiment of the invention. Referring to FIG. 4 and FIG. 9, the display driving circuit 112 includes a first gamma curve GMA1 and a second gamma curve GMA2. The second gamma curve GMA2 may be generated according to the first gamma curve GMA1. The display driving circuit 112 may drive pixels over the display panel 120 according to one of the first gamma curve GMA1 and the second gamma curve GMA2 during the first phase. In an embodiment, the display driving circuit 112 generates gamma voltages corresponding to the respective first gray levels according to the first gamma curve GMA1 for driving the pixels over the display panel 120 during the first phase.

Further, the display driving circuit 112 generates gamma voltages corresponding to the respective second gray levels according to the first gamma curve GMA1, and the generated gamma voltages are configured to drive the pixels of the first area 310 during the second phase. On the other hand, the display driving circuit 112 generates gamma voltages corresponding to the respective third gray levels according to the second gamma curve GMA2, and the generated gamma voltages are configured to drive the pixels of the second area 320 during the second phase. As illustrated in FIG. 9, for a specified pixel data, an absolute value of the generated gamma voltage in the first gamma curve GMA1 is larger than that in the second gamma curve GMA2.

Therefore, the voltage conversion operation is performed such that the gamma voltages for driving the pixels of the second area 320 is converted according to the second gamma curve GMA2 during the second phase. Thus, as the backlight is adjusted to have a high brightness for displaying the first area 310, the dark screen (or a screen with normal brightness such as the bright screen of FIG. 6) can be still displayed on the second area 320 during the second phase to compensate the high brightness of the backlight.

Figure 10:
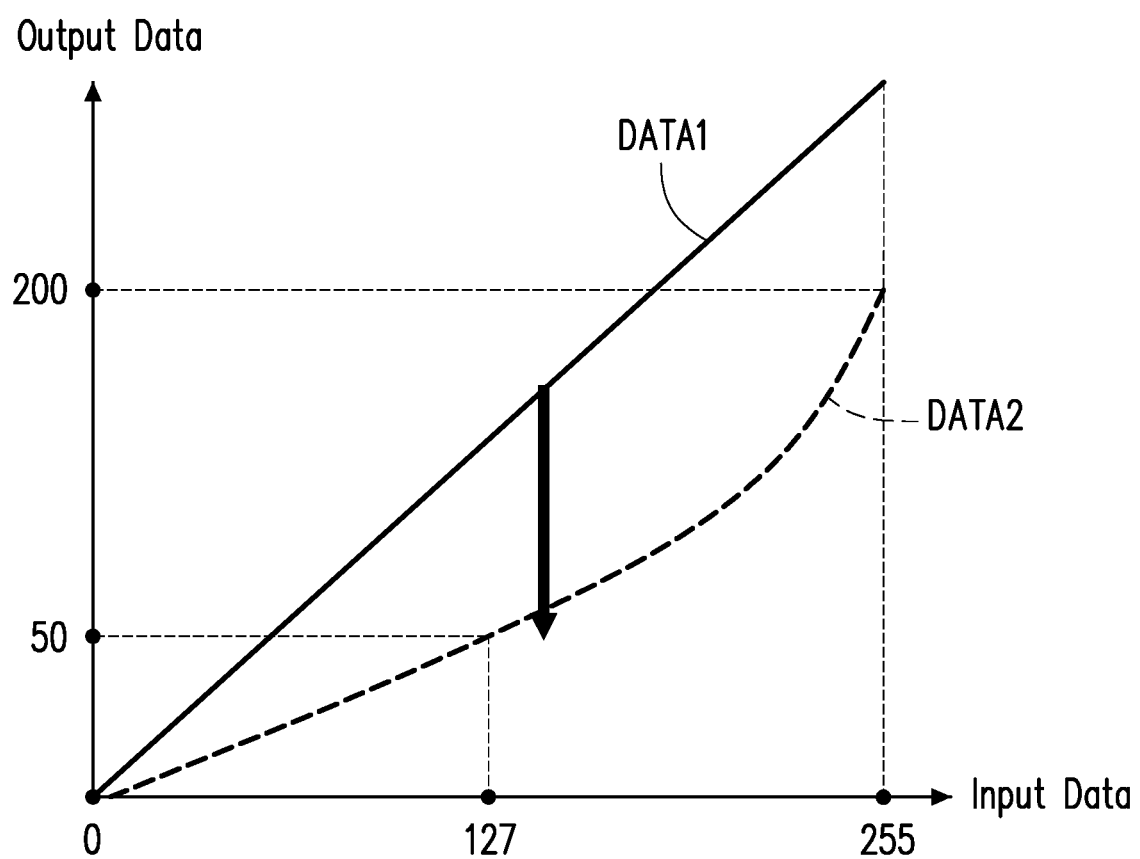
FIG. 10 illustrates a data processing operation according to an embodiment of the invention.

FIG. 10 illustrates a data processing operation according to an embodiment of the invention. Referring to FIG. 10, the display driving circuit 112 may drive pixels over the display panel 120 to display a dark screen (or a bright screen) with respective first gray levels during the first phase. The respective first gray levels are not modified during the first phase, and gamma voltages corresponding to the respective first gray levels may be generated according to the first gamma curve GMA1. In FIG. 10, the data processing curve DATA1 is a linear curve, i.e. a straight line. The display driving circuit 112 processes input data to generate output data, e.g. the respective second gray levels, to drive the pixels of the first area 310 during the second phase according to the data processing curve DATA1. The respective second gray levels are unchanged before and after the data processing operation since the data processing curve DATA1 is a linear curve. Gamma voltages corresponding to the respective second gray levels may be generated according to the first gamma curve GMA1. The generated gamma voltages are configured to drive the pixels of the first area 310 during the second phase.

On the other hand, the display driving circuit 112 processes input data, e.g. respective fourth gray levels, to generate output data, e.g. the respective third gray levels, to drive the pixels of the second area 320 during the second phase according to the data processing curve DATA2. The respective fourth gray levels are modified as the respective third gray levels after the data processing operation. For example, according to the data processing curve DATA2, the input gray level 255 is modified as the output gray level 200, and the input gray level 127 is modified as the output gray level 50. Gamma voltages corresponding to the respective third gray levels may be generated according to the first gamma curve GMA1. The generated gamma voltages are configured to drive the pixels of the second area 320 during the second phase. In the present embodiment, Gamma voltages corresponding to the respective second gray levels and the respective third gray levels may be generated according to the same gamma curve, e.g. the first gamma curve GMA1. After the data processing operation, the respective gray levels are modified, and the dark screen (or the bright screen) can be still displayed on the second area 320 during the second phase to compensate the high brightness of the backlight.

Figure 11:
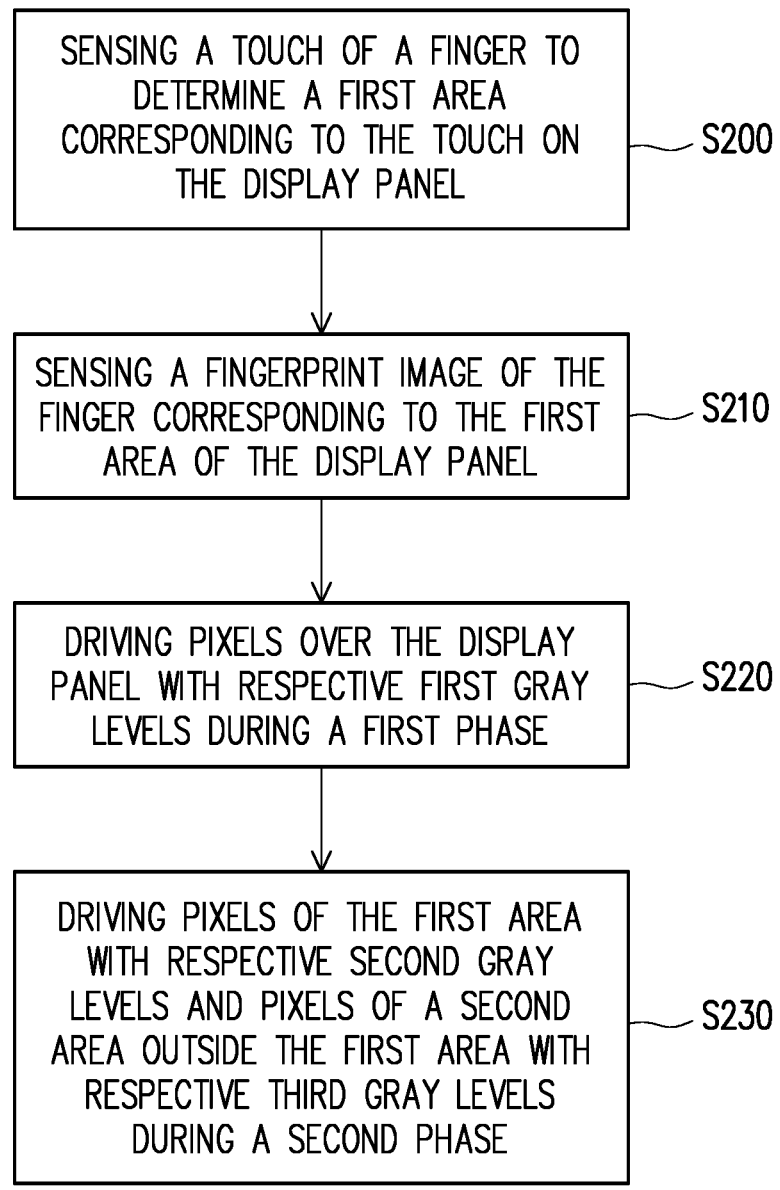
FIG. 11 is a flowchart illustrating steps in a method for driving a display panel according to an embodiment of the invention.

FIG. 11 is a flowchart illustrating steps in a method for driving a display panel according to an embodiment of the invention. Referring to FIG. 4, FIG. 5 and FIG. 11, the method for driving the display panel of the present embodiment is at least adapted to the electronic device 200 depicted in FIG. 4, but the disclosure is not limited thereto. Taking the electronic device 200 for example, in step S200, the touch sensing circuit 114 senses a touch of a finger to determine a first area 310 corresponding to the touch on the display panel 120. In step S210, the fingerprint sensing circuit 116 senses a fingerprint image of the finger corresponding to the first area 310 of the display panel 120. In step S220, the display driving circuit 112 drives pixels over the display panel 120 with respective first gray levels during a first phase. In step S230, the display driving circuit 112 drives pixels of the first area 310 with respective second gray levels and pixels of a second area 320 outside the first area 310 with respective third gray levels during a second phase.

The method for driving the display panel in the embodiment of the invention is sufficiently taught, suggested, and embodied in the embodiments illustrated in FIG. 4 to FIG. 10, and therefore no further description is provided herein.

In summary, in the embodiments of the invention, the touch sensing circuit performs the touch sensing operation to determine a fingerprint input region, and controls the fingerprint sensing circuit to initiate the fingerprint scanning for the fingerprint input region via the first interface circuit without via an application processor. The scanning region is a local region of the whole display panel. In addition, the touch sensing circuit controls the display driving circuit to drive pixels with a display pattern indicating the fingerprint input region via a second interface circuit without via the application processor. Therefore, the method for the fingerprint sensing and identification is more efficient. The fingerprint input region may have different brightness from that of the non-sensing region. The non-sensing region is driven by lower voltages to compensate the high brightness of the backlight when the fingerprint input region is displayed, such that users have good user experience.

It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:

1. An electronic circuit adapted to drive a display panel comprising touch sensors and fingerprint sensors, the electronic circuit comprising:
   a touch sensing circuit, configured to sense a touch of a finger and determine a first area corresponding to the touch on the display panel;
   a fingerprint sensing circuit, configured to sense a fingerprint image of the finger corresponding to the first area of the display panel; and
   a display driving circuit, configured to drive pixels of the first area with respective first gray levels and pixels of a second area outside the first area with respective second gray levels,
   wherein the display driving circuit processes respective third gray levels to obtain the respective second gray levels, and the display driving circuit generates gamma voltages corresponding to the respective first gray levels and the respective second gray levels according to a same gamma curve.

2. The electronic circuit of claim 1, wherein at least one of the respective third gray levels is higher than a corresponding one of the respective second gray levels.

3. The electronic circuit of claim 1, wherein the display driving circuit further processes respective fourth gray levels to obtain the respective first gray levels, wherein the respective first gray levels and the respective second gray levels are obtained according to different data processing curves.

4. The electronic circuit of claim 1, wherein an average brightness of the first area is higher than an average brightness of the second area.

5. An electronic circuit adapted to drive a display panel comprising touch sensors and fingerprint sensors, the electronic circuit comprising:
- a touch sensing circuit, configured to sense a touch of a finger and determine a first area corresponding to the touch on the display panel;
- a fingerprint sensing circuit, configured to sense a fingerprint image of the finger corresponding to the first area of the display panel; and
- a display driving circuit, configured to drive pixels of the first area with respective first gray levels and pixels of a second area outside the first area with respective second gray levels,
- wherein the display driving circuit generates first gamma voltages corresponding to the respective first gray levels according to a first gamma curve in an operation mode, and the display driving circuit generates second gamma voltages corresponding to the respective second gray levels according to a second gamma curve in the operation mode.

6. The electronic circuit of claim 5, wherein an absolute value of one of the first gamma voltages is larger than an absolute value of a corresponding one of the second gamma voltages for a specified pixel data.

7. The electronic circuit of claim 5, wherein an average brightness of the first area is higher than an average brightness of the second area.

8. An electronic circuit adapted to drive a display panel comprising touch sensors and fingerprint sensors, comprising:
- a touch sensing circuit, configured to sense a touch of a finger and determine a first area corresponding to the touch on the display panel;
- a fingerprint sensing circuit, configured to sense a fingerprint image of the finger corresponding to the first area of the display panel;
- a first interface circuit, wherein the touch sensing circuit, via the first interface circuit, controls the fingerprint sensing circuit to scan the first area and sense the fingerprint image from the first area;
- a display driving circuit, configured to drive pixels of the first area of the display panel; and
- a second interface circuit, wherein the touch sensing circuit, via the second interface circuit, controls the display driving circuit to drive the pixels of the first area,
- wherein the electronic circuit is implemented in a single semiconductor chip, and the first interface circuit and the second interface circuit are disposed inside the single semiconductor chip.

9. The electronic circuit of claim 8,
- wherein the touch sensing circuit, via the second interface circuit, controls the display driving circuit to drive the pixels of the first area with respective first gray levels and pixels of a second area outside the first area with respective second gray levels,
- wherein the display driving circuit processes respective third gray levels to obtain the respective second gray levels, and the display driving circuit generates gamma voltages corresponding to the respective first gray levels and the respective second gray levels according to a same gamma curve.

10. The electronic circuit of claim 9, wherein at least one of the respective third gray levels is higher than a corresponding one of the respective second gray levels.

11. The electronic circuit of claim 9, wherein the display driving circuit further processes respective fourth gray levels to obtain the respective first gray levels, wherein the display driving circuit generates the respective first gray levels and the respective second gray levels according to different data processing curves.

12. The electronic circuit of claim 9, wherein an average brightness of the first area is higher than an average brightness of the second area.

13. The electronic circuit of claim 8,
- wherein the touch sensing circuit, via the second interface circuit, controls the display driving circuit to drive the pixels of the first area with respective first gray levels and pixels of a second area outside the first area with respective second gray levels,
- wherein the display driving circuit generates first gamma voltages corresponding to the respective first gray levels according to a first gamma curve in an operation mode, and the display driving circuit generates second gamma voltages corresponding to the respective second gray levels according to a second gamma curve in the operation mode.

14. The electronic circuit of claim 13, wherein an absolute value of one of the first gamma voltages is larger than an absolute value of a corresponding one of the second gamma voltages for a specified pixel data.

15. An electronic circuit adapted to drive a display panel comprising touch sensors and fingerprint sensors, comprising:
- a touch sensing circuit, configured to sense a touch of a finger and determine a first area corresponding to the touch on the display panel;
- a fingerprint sensing circuit, configured to sense a fingerprint image of the finger corresponding to the first area of the display panel;
- a first interface circuit, wherein the touch sensing circuit, via the first interface circuit, controls the fingerprint sensing circuit to scan the first area and sense the fingerprint image of the finger from the first area;
- a display driving circuit, configured to drive pixels of the first area of the display panel; and
- a second interface circuit, wherein the touch sensing circuit, via the second interface circuit, controls the display driving circuit to drive the pixels of the first area,
- wherein the electronic circuit is implemented in at least two semiconductor chips comprising a first semiconductor chip and a second semiconductor chip, wherein the first semiconductor chip comprises the touch sensing circuit and the display driving circuit, and the second semiconductor chip comprises the fingerprint sensing circuit,
- wherein the second interface circuit is disposed inside the first semiconductor chip, and the first semiconductor chip and the second semiconductor chip communicate with each other via the first interface circuit.

16. The electronic circuit of claim 15,
- wherein the touch sensing circuit, via the second interface circuit, controls the display driving circuit to drive the pixels of the first area with respective first gray levels and pixels of a second area outside the first area with respective second gray levels, wherein the display driving circuit processes respective third gray levels to obtain the respective second gray levels, and the display driving circuit generates gamma voltages corresponding to the respective first gray levels and the respective second gray levels according to a same gamma curve.

17. The electronic circuit of claim 16, wherein at least one of the respective third gray levels is higher than a corresponding one of the respective second gray levels.

18. The electronic circuit of claim 16, wherein the display driving circuit further processes respective fourth gray levels to obtain the respective first gray levels, wherein the display driving circuit generates the respective first gray levels and the respective second gray levels according to different data processing curves.

19. The electronic circuit of claim 16, wherein an average brightness of the first area is higher than an average brightness of the second area.

20. The electronic circuit of claim 15, wherein the touch sensing circuit, via the second interface circuit, controls the display driving circuit to drive the pixels of the first area with respective first gray levels and pixels of a second area outside the first area with respective second gray levels, wherein the display driving circuit generates first gamma voltages corresponding to the respective first gray levels according to a first gamma curve in an operation mode, and the display driving circuit generates second gamma voltages corresponding to the respective second gray levels according to a second gamma curve in the operation mode.

21. The electronic circuit of claim 20, wherein an absolute value of one of the first gamma voltages is larger than an absolute value of a corresponding one of the second gamma voltages for a specified pixel data.

22. A method for driving a display panel comprising touch sensors and fingerprint sensors, and the method comprising:

sensing a touch of a finger to determine a first area corresponding to the touch on the display panel;

sensing a fingerprint image of the finger corresponding to the first area of the display panel;

driving pixels of the first area with respective first gray levels and pixels of a second area outside the first area with respective second gray levels;

processing respective third gray levels to obtain the respective second gray levels; and generating gamma voltages corresponding to the respective first gray levels and the respective second gray levels according to a same gamma curve.

23. The method of claim 22, further comprising:

processing respective fourth gray levels to obtain the respective first gray levels, wherein the respective first gray levels and the respective second gray levels are obtained according to different data processing curves.

24. The method of claim 22, wherein an average brightness of the first area is higher than an average brightness of the second area.

25. A method for driving a display panel comprising touch sensors and fingerprint sensors, and the method comprising:

sensing a touch of a finger to determine a first area corresponding to the touch on the display panel;

sensing a fingerprint image of the finger corresponding to the first area of the display panel;

driving pixels of the first area with respective first gray levels and pixels of a second area outside the first area with respective second gray levels;

generating first gamma voltages corresponding to the respective first gray levels according to a first gamma curve in an operation mode; and generating second gamma voltages corresponding to the respective second gray levels according to a second gamma curve in the operation mode.

26. The method of claim 25, wherein an average brightness of the first area is higher than an average brightness of the second area.

* * * * *